(12) United States Patent
Scheer et al.

(10) Patent No.: US 12,134,434 B2
(45) Date of Patent: Nov. 5, 2024

(54) TORQUE SENSOR, STEERING ANGLE SENSOR AND CORRESPONDING INTEGRATED SENSOR AND MONITORING SYSTEM

(71) Applicant: Robert Bosch GmbH, Stuttgart (DE)

(72) Inventors: Mirko Scheer, Jiangsu (CN); Gaofeng Liang, Jiangsu (CN); Joe Li, Jiangsu (CN); Guotao Chen, Jiangsu (CN)

(73) Assignee: Robert Bosch GmbH, Stuttgart (DE)

( * ) Notice: Subject to any disclaimer, the term of this patent is extended or adjusted under 35 U.S.C. 154(b) by 391 days.

(21) Appl. No.: 17/619,830

(22) PCT Filed: Jun. 29, 2020

(86) PCT No.: PCT/EP2020/068180
§ 371 (c)(1),
(2) Date: Dec. 16, 2021

(87) PCT Pub. No.: WO2020/260677
PCT Pub. Date: Dec. 30, 2020

(65) Prior Publication Data
US 2022/0306192 A1 Sep. 29, 2022

(30) Foreign Application Priority Data
Jun. 27, 2019 (CN) .......................... 201910566822.9

(51) Int. Cl.
*G01L 3/10* (2006.01)
*B62D 6/10* (2006.01)
*B62D 15/02* (2006.01)

(52) U.S. Cl.
CPC ........... *B62D 6/10* (2013.01); *B62D 15/0225* (2013.01); *G01L 3/105* (2013.01)

(58) Field of Classification Search
CPC .. B62D 6/10; B62D 15/0225; B62D 15/0245; B62D 15/0215; B62D 15/02; G01L 3/105; G01L 3/104; G01L 5/221; G01D 5/145
See application file for complete search history.

(56) References Cited

U.S. PATENT DOCUMENTS 8,988,066 B2 * 3/2015 Shao .......................... G01B 7/30
324/207.16
9,702,416 B2 * 7/2017 Shao ....................... G01D 5/145
(Continued)

FOREIGN PATENT DOCUMENTS

CN 103403501 A 11/2013
CN 108602531 A 9/2018
(Continued)

OTHER PUBLICATIONS

International Search Report corresponding to PCT Application No. PCT/EP2020/068180, mailed Oct. 5, 2020 (3 pages).

*Primary Examiner* — Freddie Kirkland, III
(74) *Attorney, Agent, or Firm* — Maginot, Moore & Beck LLP

(57) ABSTRACT

A torque sensor includes an input rotation component, which rotates with a steering column input shaft and is provided with a first conducting part, an output rotation component which rotates with a steering column output shaft and is provided with a second conducting part, and an electromagnetic carrier positioned in a positionally fixed manner and provided with a magnetic field generating component and a magnetic field detection component. The magnetic field generating component generates a magnetic field penetrating the first conducting part and the second conducting part, the magnetic field detection component detects a change in the magnetic field caused by a change in the positions of the first and second conducting parts in the magnetic field when (Continued)

the steering column is under torsional stress, and the steering torque is determined on the basis of the detected change in the magnetic field.

20 Claims, 9 Drawing Sheets

(56) References Cited

U.S. PATENT DOCUMENTS

| | | | | |
|---|---|---|---|---|
| 9,821,846 B2* | 11/2017 | Schoepe | | G01D 5/14 |
| 9,914,477 B2* | 3/2018 | Shao | | B62D 6/10 |
| 10,067,015 B2* | 9/2018 | Lee | | G01L 5/22 |
| 10,739,215 B2* | 8/2020 | Lee | | G01L 3/02 |
| 10,794,781 B2* | 10/2020 | Toyama | | G01L 3/104 |
| 10,837,847 B2* | 11/2020 | Smith, Jr. | | G01B 7/30 |
| 10,837,848 B2* | 11/2020 | Janisch | | G01D 5/2053 |
| 10,845,259 B2* | 11/2020 | Toyama | | B62D 15/0215 |
| 10,921,155 B2* | 2/2021 | Shaga | | G01D 3/08 |
| 2008/0238416 A1* | 10/2008 | Shiraga | | B62D 15/0215 |
| | | | | 324/207.25 |
| 2010/0084215 A1* | 4/2010 | Sakatani | | B62D 6/10 |
| | | | | 180/444 |
| 2012/0223700 A1* | 9/2012 | Shao | | G01L 3/105 |
| | | | | 324/207.16 |
| 2013/0249538 A1* | 9/2013 | Oike | | B62D 6/10 |
| | | | | 324/207.25 |
| 2016/0138983 A1* | 5/2016 | Ikeda | | G01L 3/101 |
| | | | | 73/862.193 |
| 2016/0214648 A1* | 7/2016 | Schoepe | | G01L 3/104 |
| 2016/0379754 A1* | 12/2016 | Rachui | | C21D 3/04 |
| | | | | 73/862.333 |
| 2017/0166251 A1* | 6/2017 | Shao | | G01L 3/105 |
| 2017/0254711 A1* | 9/2017 | Park | | G01L 3/104 |

FOREIGN PATENT DOCUMENTS

| | | |
|---|---|---|
| DE | 10 2012 024 383 A1 | 6/2014 |
| JP | 2014-511490 A | 5/2014 |
| WO | 2012/117293 A1 | 9/2012 |
| WO | 2017/100515 A1 | 6/2017 |

* cited by examiner

TORQUE SENSOR, STEERING ANGLE SENSOR AND CORRESPONDING INTEGRATED SENSOR AND MONITORING SYSTEM This application is a 35 U.S.C. § 371 National Stage Application of PCT/EP2020/068180, filed on Jun. 29, 2020, which claims the benefit of priority to Serial No. CN 201910566822.9, filed on Jun. 27, 2019 in China, the disclosures of which are incorporated herein by reference in their entirety.

TECHNICAL FIELD

The present disclosure relates to a torque sensor, an integrated torque and angle sensor (TAS) configured to monitor a steering state of a vehicle, a steering angle sensor, and an active steering state monitoring system comprising such a sensor.

BACKGROUND ART

Existing and future steering systems, such as electronically controlled power steering systems (EHPS), electric power steering systems (EPS) and adaptive electric power steering systems, and certain driving assistance functions such as vehicle body electronic stability systems (ESP) and advanced driving assistance systems (ADAS), require reliable and cheaply obtainable steering torque and/or angle information. Sensors for detecting steering need to cover a great many application variants (different steering columns, independent fixing structures, integration in combined switches, etc.), and are preferably very cheap and reliable. No sensor solution available in the prior art is able to simultaneously meet these requirements.

SUMMARY OF THE INVENTION

In view of the prior art mentioned above, an object of the present disclosure is to provide a torque sensor, an integrated torque and angle sensor configured to monitor a steering state of a vehicle, a steering angle sensor, and an active steering state monitoring system comprising such a sensor.

According to a first aspect of the present disclosure, a torque sensor for detecting a steering torque of a steering column is provided, wherein the steering column comprises an input shaft, an output shaft and a torsion bar connected between the input shaft and the output shaft, the torque sensor comprising: an input rotation component, capable of rotating together with the input shaft and provided with a first conducting part; an output rotation component, capable of rotating together with the output shaft and provided with a second conducting part; and an electromagnetic carrier, positioned in a positionally fixed manner and provided with a magnetic field generating means and a magnetic field detection means, wherein the magnetic field generating means is configured to generate a magnetic field penetrating the first conducting part and the second conducting part, the magnetic field detection means is configured to detect a change in the magnetic field caused by a change in the positions of the first conducting part and second conducting part in the magnetic field when the steering column is under torsional stress, and the steering torque is determined at least on the basis of the detected change in the magnetic field.

According to a second aspect of the present disclosure, an integrated torque and angle sensor for detecting a steering torque and a steering angle of a steering column is provided, the integrated torque and angle sensor at least comprising: a torque detection means for detecting the steering torque; and an angle detection means for detecting the steering angle; wherein the torque detection means is configured to comprise the torque sensor.

According to a third aspect of the present disclosure, a steering angle sensor for detecting a steering angle of a steering column is provided, at least comprising: a sleeve gear to be mounted on the steering column; a first measurement gear meshed with the sleeve gear; a first angle detector, for measuring a rotation angle of the first measurement gear; a rotation component, capable of rotating together with the steering column and provided with a conducting part; and an electromagnetic carrier, positioned in a positionally fixed manner and provided with a magnetic field generating means and a magnetic field detection means; wherein the magnetic field generating means is configured to generate a magnetic field penetrating the conducting part, the magnetic field detection means is configured to detect a change in the magnetic field caused by a change in the position of the conducting part in the magnetic field when the steering column rotates, rotation angle information of the steering column is obtained on the basis of the detected change in the magnetic field, and the steering angle sensor is configured to detect the steering angle at least on the basis of the rotation angle information of the steering column and the rotation angle of the first measurement gear.

According to a fourth aspect of the present disclosure, an active steering state monitoring system is provided, comprising the torque sensor or the integrated torque and angle sensor or the steering angle sensor.

The sensor of the present disclosure may be used for various functions of a vehicle, e.g. in vehicle body electronic stability systems, advanced driving assistance systems, highly automated driving (HAD) and fault protection or fault operation solutions. There is no mechanical lag, and the cost of sensor manufacture is low.

BRIEF DESCRIPTION OF THE DRAWINGS

A more comprehensive understanding of the abovementioned and other aspects of the present disclosure will be gained through the following detailed description in conjunction with the drawings, which comprise the following.

DETAILED DESCRIPTION

Some demonstrative embodiments of the present disclosure are described in further detail below with reference to the drawings, to provide a better understanding of the basic idea and advantages of the present disclosure.

A first aspect of the present disclosure relates to a torque sensor configured to detect a steering torque of a steering column of a vehicle.

Figure 1:
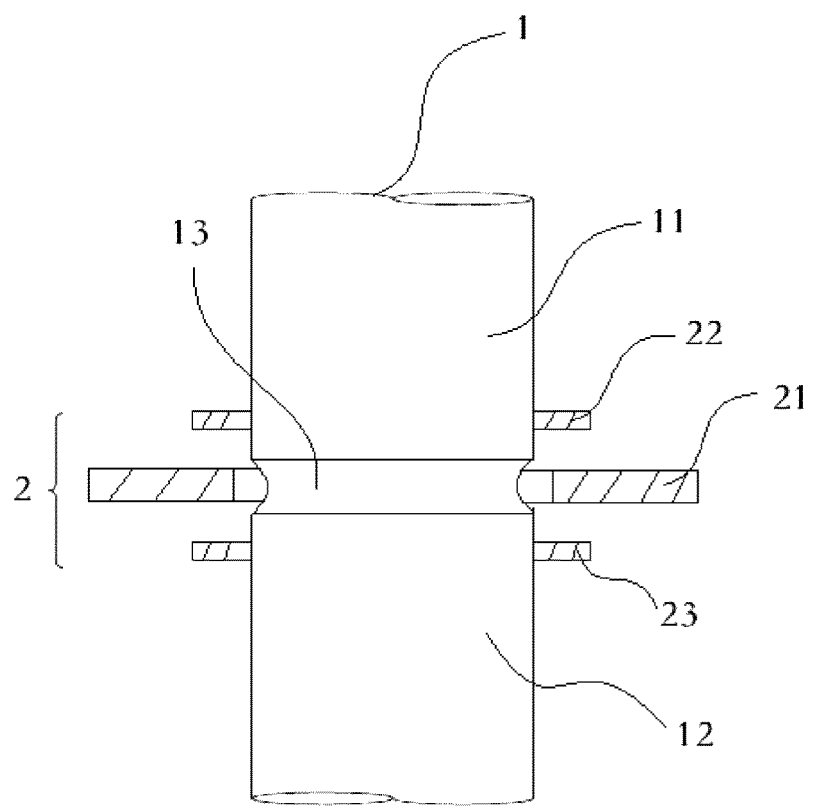
FIG. 1 shows a steering column of a vehicle, and a torque sensor configured to detect a steering torque of the steering column.

The torque sensor may be formed in various configurations, one of which is shown in FIG. 1 as a very schematic view. FIG. 1 shows a steering column 1 of a vehicle, and a torque sensor 2 configured to detect a steering torque of the steering column 1.

As shown in FIG. 1, the steering column 1 is demonstratively and schematically configured to comprise an input shaft 11 from a steering wheel (not shown), an output shaft 12 to a steering shaft connector (not shown), and a torsion bar 13 connected between the input shaft 11 and the output shaft 12. The torque sensor 2 is disposed close to the torsion bar 13.

Those skilled in the art will understand that, making use of the known mechanical characteristics of the material of the torsion bar 13, it is possible to determine the steering torque on the basis of a relative rotation angle of the input shaft 11 relative to the output shaft 12; the relative rotation angle can characterize twisting deformation of the torsion bar 13.

The torque sensor 2 mainly comprises an electromagnetic carrier 21 mounted in a fixed manner in a housing (not shown), an input rotation component 22 capable of rotating together with the input shaft 11, and an output rotation component 23 capable of rotating together with the output shaft 12. The housing may be fixed in the vehicle for example by means of an independent fixing structure.

For example, the input rotation component 22 is fixed to the input shaft 11, and the output rotation component 23 is fixed to the output shaft 12.

According to a demonstrative embodiment of the present disclosure, the input rotation component 22 is provided with a first conducting part, the output rotation component 23 is provided with a second conducting part, and the electromagnetic carrier 21 is provided with a magnetic field generating means and a magnetic field detection means, wherein, for clarity, the first conducting part, second conducting part, magnetic field generating means and magnetic field detection means are not shown in FIG. 1. The magnetic field generating means is configured to generate a magnetic field penetrating the first conducting part and second conducting part, and the magnetic field detection means is configured to detect a change in the magnetic field caused by a change in the positions of the first conducting part and second conducting part in the magnetic field when the steering column 1 is under torsional stress. The steering torque can be determined at least on the basis of the detected change in the magnetic field.

The term "conducting" means "magnetically conducting and/or electrically conducting".

According to a demonstrative embodiment of the present disclosure, the magnetic field detection means may comprise: a first magnetic field detection element, for detecting a change in the magnetic field caused by a change in the position of the first conducting part in the magnetic field; and a second magnetic field detection element, for detecting a change in the magnetic field caused by a change in the position of the second conducting part in the magnetic field. In this case, the first magnetic field detection element and second magnetic field detection element are preferably disposed at opposite sides of the electromagnetic carrier 21, such that the first magnetic field detection element faces the first conducting part, and the second magnetic field detection element faces the second conducting part.

According to a demonstrative embodiment of the present disclosure, the magnetic field generating means may comprise: a first magnetic field generating element, for generating a first magnetic field penetrating the first conducting part; and a second magnetic field generating element, for generating a second magnetic field penetrating the second conducting part. In this case, the magnetic field detection means detects a change in the first magnetic field caused by a change in the position of the first conducting part in the first magnetic field, and a change in the second magnetic field caused by a change in the position of the second conducting part in the second magnetic field.

However, preferably, the magnetic field generating means only comprises one magnetic field generating element.

Specifically, at least on the basis of a detected change in the magnetic field caused by a change in the position of the first conducting part in the magnetic field, a first rotation angle of the input shaft 11, in particular of the first conducting part relative to the electromagnetic carrier 21 can be determined, and similarly, at least on the basis of a detected change in the magnetic field caused by a change in the position of the second conducting part in the magnetic field, a second rotation angle of the output shaft 12, in particular of the second conducting part relative to the electromagnetic carrier 21 can be determined, and it is thereby possible to determine the relative rotation angle of the input shaft 11 relative to the output shaft 12, i.e. the angle difference between the first rotation angle and the second rotation angle.

It will be noted that it is also possible, and might be advantageous, to determine the relative rotation angle of the input shaft 11 relative to the output shaft 12 directly without determining the first rotation angle and second rotation angle. This is described further below with reference to some specific embodiments, and will thereby become more obvious.

According to a demonstrative embodiment of the present disclosure, the electromagnetic carrier 21 is configured to comprise a printed circuit board (PCB), with the magnetic field generating means and the magnetic field detection means being disposed on the printed circuit board.

According to a demonstrative embodiment of the present disclosure, the magnetic field generating means is configured to comprise a magnetic field generating coil which preferably surrounds the torsion bar 13 during use, and/or the magnetic field detection means is configured to comprise a magnetic field detection coil.

Figure 2:
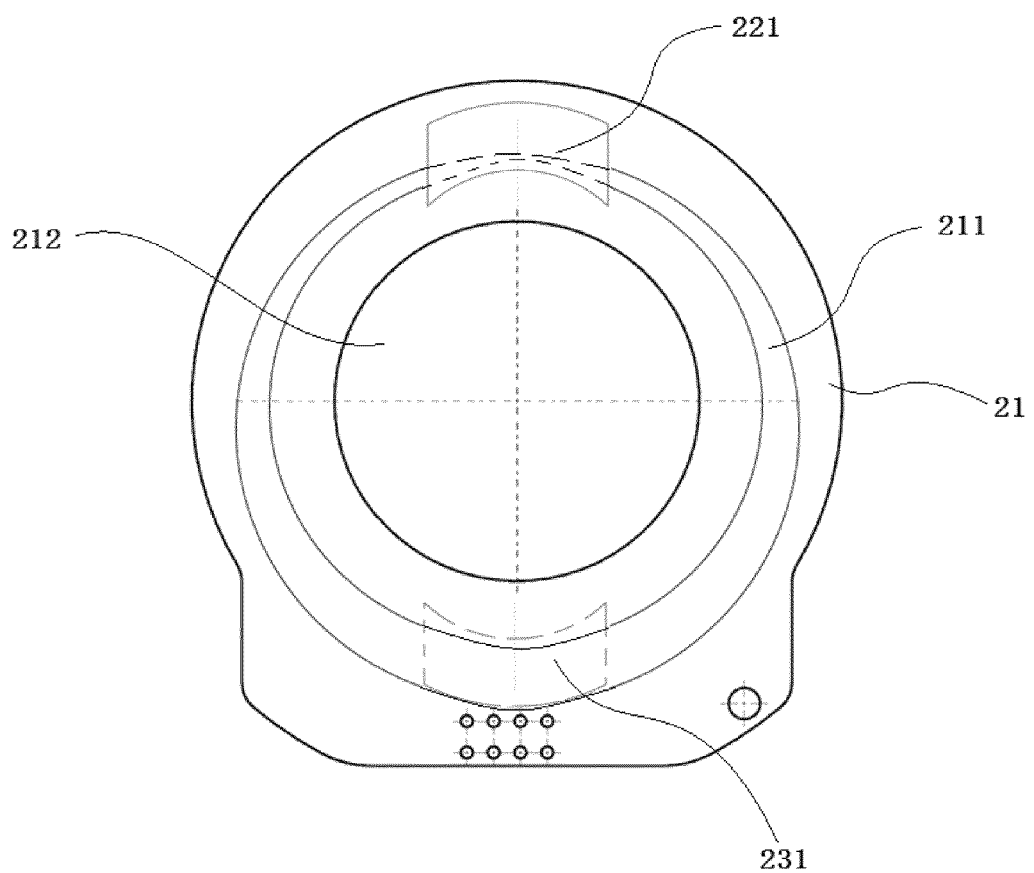
FIG. 2 shows schematically, as a top view, an arrangement of a first conducting part, a second conducting part and an electromagnetic carrier, according to a demonstrative embodiment of the present disclosure.

FIG. 2 shows schematically, as a top view, an arrangement of a first conducting part 221, a second conducting part 231 and the electromagnetic carrier 21, according to a demonstrative embodiment of the present disclosure.

Preferably, the first conducting part 221 and/or the second conducting part 231 may be configured as a metal insert.

As shown in FIG. 2, the electromagnetic carrier 21 is provided with a magnetic field generating coil 211 and a mounting through-hole 212, wherein the magnetic field generating coil 211 surrounds the mounting through-hole 212, and the steering column 1 can extend through the through-hole 212 in a contact-free manner during use. The magnetic field generating coil 211 has a changing electromagnetic characteristic at least within a predetermined angular range in a circumferential direction, e.g. a changing coil track, especially a coil track that is unique with position, such that at least the relative rotation angle of the input shaft 11 relative to the output shaft 12 can be finally detected.

FIG. 2 shows demonstrative relative positions of the first conducting part 221 and the second conducting part 231 relative to the magnetic field generating coil 211. When the first conducting part 221 rotates with the input shaft 11 to an angular position that is different from the current angular position, the magnetic field detection means will detect a corresponding magnetic field change signal caused by a change in the electromagnetic characteristic of the magnetic field generating coil 211 in the circumferential direction, and can thereby detect a rotation angle of the first conducting part 221. Similarly, a rotation angle of the second conducting part 231 can also be detected. In this case, the relative rotation angle of the input shaft 11 relative to the output shaft 12 can be determined by means of the rotation angles of the first conducting part 221 and the second conducting part 231.

Those skilled in the art will understand that the relative rotation angle of the input shaft 11 relative to the output shaft 12 is relatively small, and can therefore be determined by means of a change in the magnetic field caused by the combination of the first conducting part 221 and the second conducting part 231 together, with no need to separately determine the rotation angles of the first conducting part 221 and the second conducting part 231.

In general, the magnetic field generating means, in particular the magnetic field generating coil 211, may be configured in any suitable form, as long as the relative rotation angle of the input shaft 11 relative to the output shaft 12 can be determined on the basis of a change in the magnetic field detected by the magnetic field detection means.

Preferably, as shown in FIG. 2, when viewed along a central axis of the through-hole 212, i.e. a longitudinal axis of the steering column 1, the first conducting part 221 and/or second conducting part 231 at least partially overlap the magnetic field generating coil 211 in an assembled state.

Figure 3:
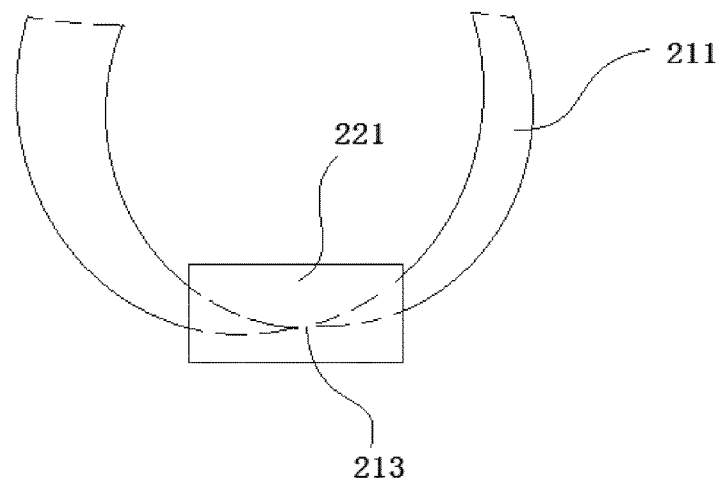
FIG. 3 shows schematically, as a partial view, a demonstrative embodiment of a magnetic field generating coil.

Those skilled in the art will also understand that the magnetic field generating coil 211 need not be completely closed. For example, FIG. 3 shows schematically, as a partial view, a demonstrative embodiment of the magnetic field generating coil 211. As shown in FIG. 3, the magnetic field generating coil 211 may have a small gap 213 which can be covered by the first conducting part 221.

In addition, although the input rotation component 22 and the output rotation component 23 are disposed at opposite sides of the electromagnetic carrier 21 as shown in FIG. 1, this does not mean that the first conducting part 221 and second conducting part 231 must be disposed at opposite sides of the magnetic field generating coil 211; on the contrary, the input rotation component 22 and the output rotation component 23 may be configured such that the first conducting part 221 and the second conducting part 231 are disposed at the same side of the magnetic field generating coil 211. This arrangement will become obvious through the description of other aspects below.

Changes in the magnetic field may be assessed and analysed by means of a processor (not shown), to obtain the steering torque of the steering column 1. Preferably, the processor may be disposed on the electromagnetic carrier 21, in particular on the printed circuit board.

It will be noted that the relative rotation angle of the input shaft 11 relative to the output shaft 12 may also be detected by suitably configuring the input rotation component 22 and the output rotation component 23; this will be described below with reference to some demonstrative embodiments.

Figure 4:
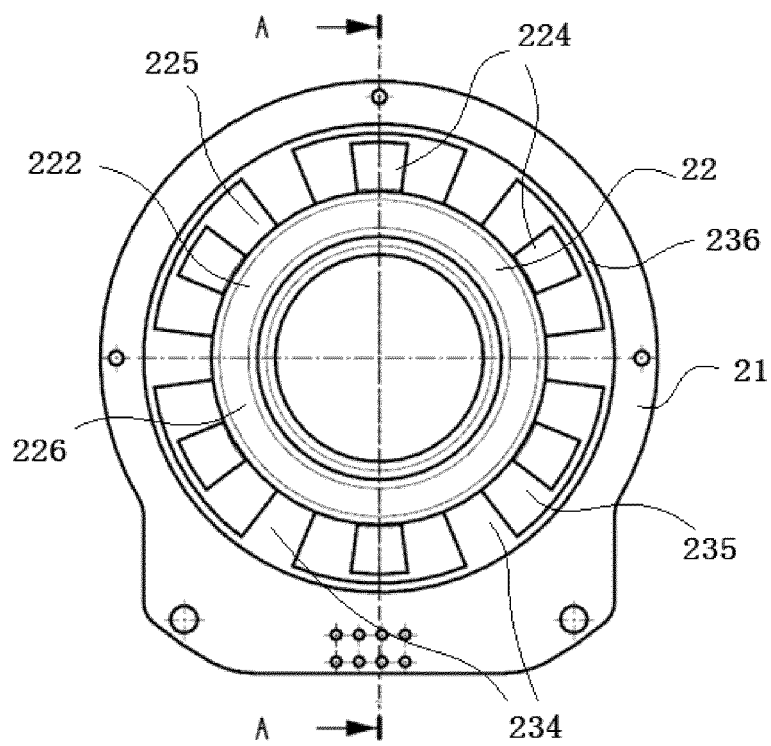
FIG. 4 shows, as a top view, an arrangement of an input rotation component, an output rotation component and an electromagnetic carrier, according to another demonstrative embodiment of the present disclosure.
Figure 5:
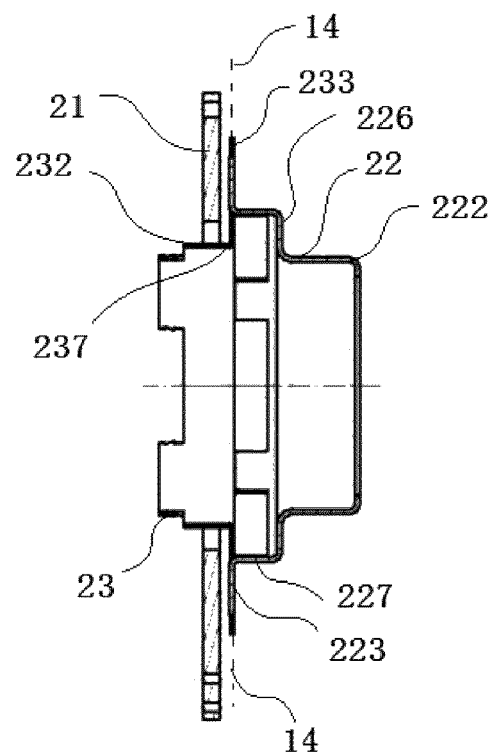
FIG. 5 shows this arrangement as a lateral sectional view taken along line A-A in FIG. 4.

FIG. 4 shows, as a top view, an arrangement of the input rotation component 22, the output rotation component 23 and the electromagnetic carrier 21, according to another demonstrative embodiment of the present disclosure. FIG. 5 shows this arrangement as a lateral sectional view taken along line A-A in FIG. 4, and FIG. 6 shows this arrangement as a three-dimensional view.

Figure 6:
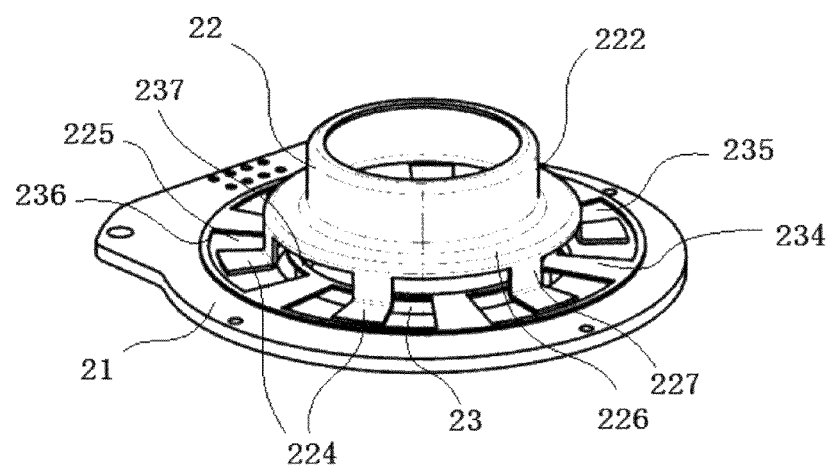
FIG. 6 shows this arrangement as a three-dimensional view.

As shown in FIGS. 4-6, the input rotation component 22 may comprise a first fixing body 222 adapted to be fixed to the input shaft 11, and a first flat patterned structure 223 as the first conducting part, while the output rotation component 23 may comprise a second fixing body 232 adapted to be fixed to the output shaft 12, and a second flat patterned structure 233 as the second conducting part, wherein the first flat patterned structure 223 and the second flat patterned structure 233 are configured to extend radially with respect to the longitudinal axis of the steering column 1 and parallel to the magnetic field detection means (not shown here), and are staggered with respect to each other when viewed in a direction parallel to the longitudinal axis, and preferably lie in a common plane 14.

Specifically, in the embodiment shown in FIGS. 4-6, the first fixing body 222 and the second fixing body 232 are both configured as hollow bodies, preferably cylinders, and during use the steering column 1 can extend through the hollow bodies, such that the input rotation component 22 and the output rotation component 23 can be fixed to the input shaft 11 and the output shaft 12 respectively. The electromagnetic carrier 21 is provided with a mounting through-hole, which allows the second fixing body 232 to extend through. The first flat patterned structure 223 extends radially outward from that end of the first fixing body 222 which is adjacent to the torsion bar 13, and the second flat patterned structure 233 extends radially outward from that end of the second fixing body 232 which is adjacent to the torsion bar 13. In particular, as shown in FIG. 5, the first flat patterned structure 223 and the second flat patterned structure 233 are disposed in the common plane 14 at that side of the electromagnetic carrier 21 which is adjacent to the input shaft 11. Of course, those skilled in the art will understand that the first flat patterned structure 223 and the second flat patterned structure 233 could also be disposed at that side of the electromagnetic carrier 21 which is adjacent to the output shaft 12.

The magnetic field generating means is preferably disposed directly below the first flat patterned structure 223 and the second flat patterned structure 233.

The first flat patterned structure 223 is configured here to comprise multiple first teeth 224 extending radially from the first fixing body 222; the first teeth are preferably distributed uniformly in the circumferential direction, such that a first receiving opening 225 is defined between any two adjacent first teeth 224. Preferably, the first teeth 224 have the same shape.

According to a demonstrative embodiment of the present disclosure, the first fixing body 222 comprises an annular platform 226 and multiple tooth connecting structures 227; the multiple tooth connecting structures 227 preferably extend axially to the first teeth 224 respectively from an outer circumference of the platform 226, such that the first teeth 224 are formed on corresponding ends, remote from the platform 226, of the teeth connecting structures 227.

Preferably, the platform 226 is configured as a flat part extending in a plane perpendicular to the longitudinal axis of the steering column 1.

The second flat patterned structure 233 is configured here to comprise multiple second teeth 234 extending radially from the second fixing body 232; the second teeth are preferably distributed uniformly in the circumferential direction, such that a second receiving opening 235 is defined between any two adjacent second teeth 234. Preferably, the second teeth 234 have the same shape.

According to a demonstrative embodiment of the present disclosure, the second teeth 234 are connected at an outer radial end thereof to an outer ring 236, and/or the second teeth 234 extend from an inner ring 237 which can be regarded as a part of the second fixing body 232. In this case, all sides of the second receiving opening 235 are completely closed.

In an assembled state, the first teeth 224 and second teeth 234 are staggered with respect to each other. More preferably, each first tooth 224 is inserted into the corresponding second receiving opening 235, and each second tooth 234 is inserted into the corresponding first receiving opening 225, such that the first teeth 224 and the second teeth 234 are in the common plane 14.

Those skilled in the art will understand that the first flat patterned structure 223 and the second flat patterned structure 233 should be able to rotate relative to each other at least within a predetermined rotation angle range, such that the relative rotation angle of the input shaft 11 relative to the output shaft 12 can be detected on the basis of a change in the magnetic field caused by a change in a combined pattern of the first flat patterned structure 223 and the second flat patterned structure 233. This means that the first tooth 224 should be smaller than the second receiving opening 235, and the second tooth 234 should be smaller than the first receiving opening 225.

As stated above, the relative rotation angle of the input shaft 11 relative to the output shaft 12 is relatively small, e.g. no more than 3 degrees; thus, the arrangement shown in FIGS. 4-6 can meet this requirement. The number of teeth can be chosen according to needs.

According to a demonstrative embodiment of the present disclosure, the input rotation component 22 may be integrally formed, and/or the output rotation component 23 may be integrally formed. Preferably, the input rotation component 22 and/or the output rotation component 23 may be formed by a stamping and/or a bending process.

Preferably, the number of first teeth 224 is equal to the number of second teeth 234, and/or the first teeth 224 and the second teeth 234 have the same shape.

Those skilled in the art will understand that the first flat patterned structure 223 and/or the second flat patterned structure 233 only cover a predetermined angular range, e.g. 270 degrees, as long as the magnetic field detection means, e.g. the magnetic field detection coil is configured to be closed in the circumferential direction, and in particular has the shape of a sine or cosine curve.

It will be noted that the combination of the first flat patterned structure 223 and the second flat patterned structure 233 can realize the differential principle, thereby increasing measurement precision, because sources of errors can be reduced.

In general, in the case of the capacitance and/or eddy current principle, there is only a limited air gap characteristic, but the arrangement shown in FIGS. 4-6 can allow the first flat patterned structure 223 and the second flat patterned structure 233 to be positioned in the common plane 14, and this can realize the required air gap between the common plane 14 and the magnetic field detection means, e.g. the magnetic field detection coil; the relative rotation angle of the input shaft 11 relative to the output shaft 12 can thereby be determined more precisely.

Those skilled in the art will understand that the shapes of the first flat patterned structure 223 and second flat patterned structure 233 may be configured in the opposite fashion, such that the first flat patterned structure 223 has the patterned structure of the second flat patterned structure 233 shown in FIGS. 4-6, and the second flat patterned structure 233 has the patterned structure of the first flat patterned structure 223 shown in FIGS. 4-6.

According to a demonstrative embodiment of the present disclosure, the magnetic field detection means is configured to comprise a magnetic field detection coil having a changing coil track shape, e.g. a gradually increasing track shape or another track shape that is unique with position; this can additionally increase detection precision. However, this is not a requirement.

Figure 7:
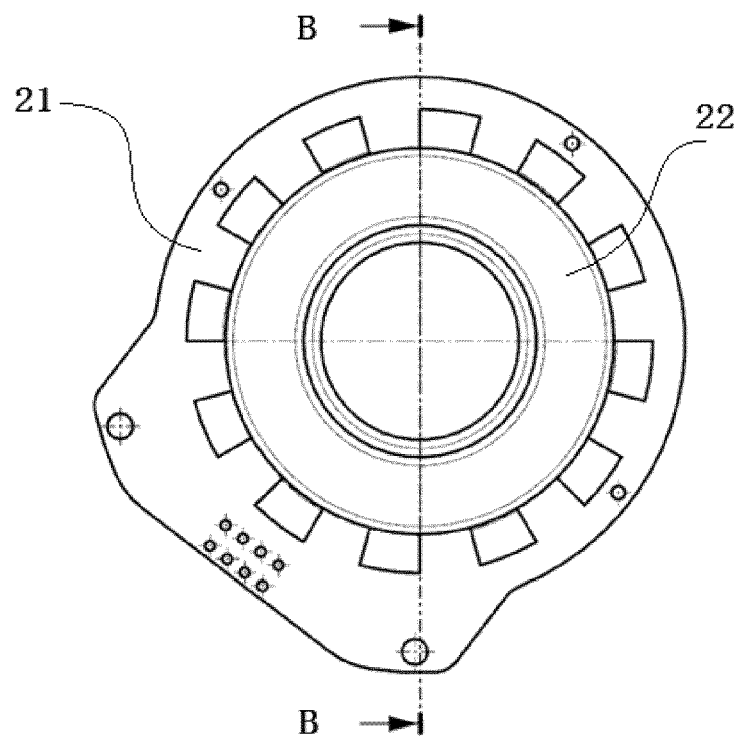
FIG. 7 shows, as a top view, an arrangement of the input rotation component, the output rotation component and the electromagnetic carrier, according to another demonstrative embodiment of the present disclosure.
Figure 8:
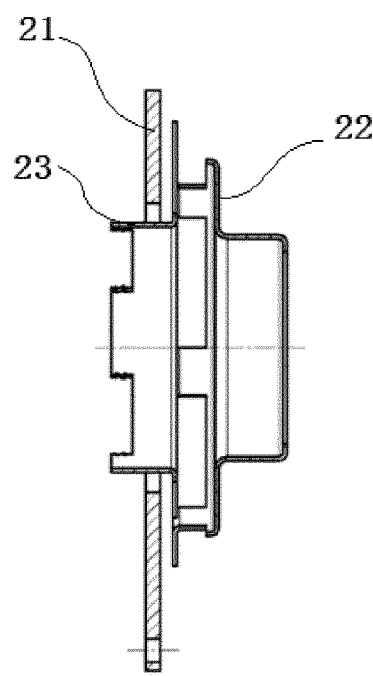
FIG. 8 shows this arrangement as a lateral sectional view taken along line B-B in FIG. 7.
Figure 9:
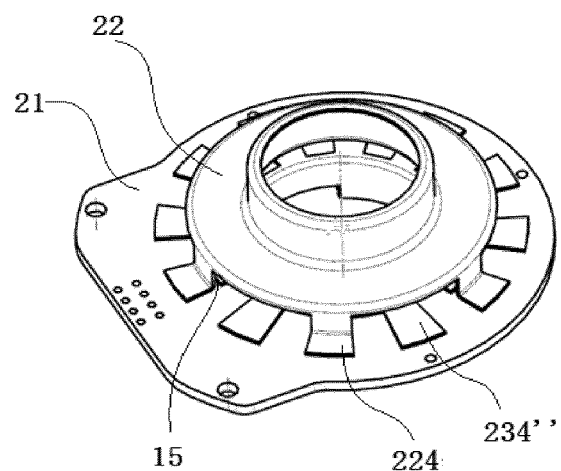
FIG. 9 shows this arrangement as a three-dimensional view.
Figure 10:
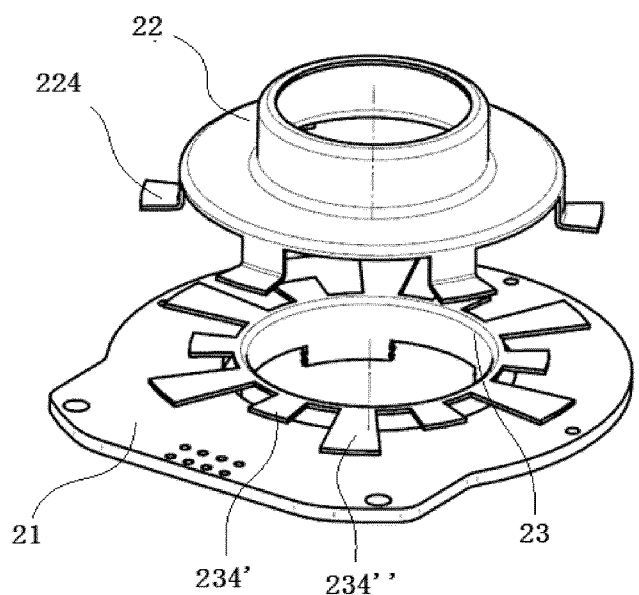
FIG. 10 shows this arrangement as an exploded view.

FIG. 7 shows, as a top view, an arrangement of the input rotation component 22, the output rotation component 23 and the electromagnetic carrier 21, according to another demonstrative embodiment of the present disclosure. FIG. 8 shows this arrangement as a lateral sectional view taken along line B-B in FIG. 7, FIG. 9 shows this arrangement as a three-dimensional view, and FIG. 10 shows this arrangement as an exploded view.

The arrangement shown in FIGS. 7-10 is similar to the arrangement shown in FIGS. 4-6, but the first flat patterned structure 223 and second flat patterned structure 233 have different tooth designs. Only the main differences are described below.

As shown in FIGS. 7-10, the first flat patterned structure 223 has N first teeth 224, and the second flat patterned structure 233 has 2*N second teeth 234 (N being an integer), wherein the first teeth 224 are configured as teeth having a first radial length, and the second teeth 234 are configured to comprise N third teeth 234' having a second radial length and N fourth teeth 234" having a third radial length; the third teeth 234' and the fourth teeth 234" are arranged alternately in the circumferential direction, and the first teeth 224 are located at a radial outer side of the third teeth 234', with a radial gap 15 between them; moreover, the third radial length is greater than the second radial length. Preferably, the first radial length is smaller than the third radial length, and/or the sum of the first radial length, the second radial length and the radial width of the radial gap 15 is equal to the third radial length, such that the first teeth 224 and the fourth teeth 234" extend radially to the same extent.

According to a demonstrative embodiment of the present disclosure, the first teeth 224 and the second teeth 234 are uniformly distributed.

According to a demonstrative embodiment of the present disclosure, the magnetic field generating means, in particular the magnetic field generating coil is disposed on the electromagnetic carrier 21 close to the radial gap 15; and the magnetic field detection means comprises a first magnetic field detection coil, located at a radial inner side of the magnetic field generating means and used to detect a rotation angle of the output shaft 12, and a second magnetic field detection coil, located at a radial outer side of the magnetic field generating means and used to detect a change in angle between the first teeth 224 and the fourth teeth 234". Thus, it is possible to simultaneously detect the relative rotation angle of the input shaft 11 relative to the output shaft 12, and the rotation angle of the output shaft 12. The first magnetic field detection coil can at least be used to review angular detection, in order to increase detection precision.

An active steering state monitoring system also often requires a steering angle of the steering column 1. A description is given below of how to detect the steering angle. Thus, a second aspect of the present disclosure relates to a steering angle sensor (SAS) for detecting the steering angle of the steering column 1.

Figure 11:
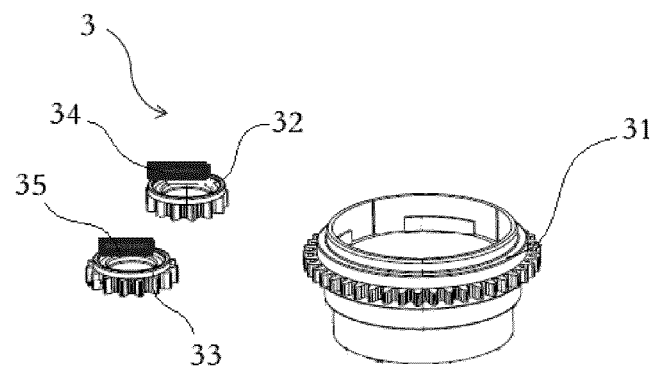
FIG. 11 shows a demonstrative embodiment of a steering angle sensor.

FIG. 11 shows a demonstrative embodiment of a steering angle sensor 3. As shown in FIG. 11, the steering angle sensor 3 mainly comprises a sleeve gear 31, a first measurement gear 32, a second measurement gear 33, a first angle detector 34 for measuring a rotation angle of the first measurement gear 32, and a second angle detector 35 for measuring a rotation angle of the second measurement gear 33, wherein the sleeve gear 31 will be mounted on the steering column 1, in particular on the output shaft 12 and represents a steering angle φ, the first measurement gear 32 has n1 teeth and is meshed with the sleeve gear 31, and the second measurement gear 33 has n2 teeth and is meshed with the sleeve gear 31. The rotation angle of the first measurement gear 32 is represented by θ, the rotation angle of the second measurement gear 33 is represented by ψ, and n1 and n2 are chosen so as not to be precisely divisible by each other. For example, the first measurement gear 32 and the second measurement gear 33 differ by one tooth. Of course, they may also differ by any suitable number of teeth.

Figure 12:
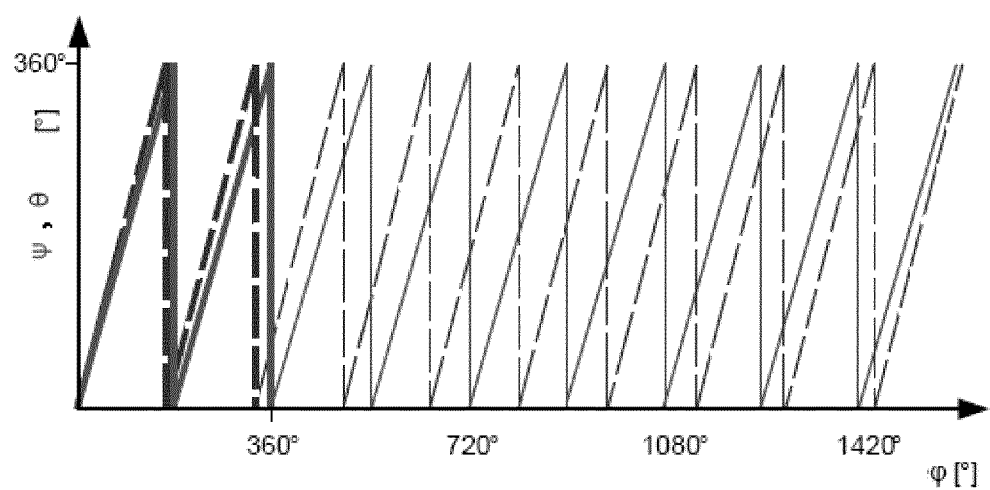
FIG. 12 shows demonstratively the output characteristics of two measured angles θ and ψ, wherein the dotted line represents θ.

Thus, this arrangement realizes the cursor (Nonius) principle. FIG. 12 shows demonstratively the output characteristics of the two measured angles θ and ψ, wherein the dotted line represents θ.

Using this principle, it is possible to determine a clear steering angle within more than four full revolutions of the steering wheel. In addition, on each occasion that startup or energization takes place, the position thereof is known because the steering angle sensor has the two angles θ and ψ.

The first angle detector 34 comprises: a magnet that is magnetized in a diameter direction, and which is disposed in a fixed manner at the centre of rotation of the first measurement gear 32; and a detection element, which is used to detect the rotation angle θ on the basis of a change in the magnetic field caused by rotation of the magnet. The second angle detector 35 may also have a similar design. In this case, a standby current is not needed.

Those skilled in the art will understand that the embodiments above are merely demonstrative, and other embodiments may be conceptualized on the basis of the cursor principle.

Figure 13:
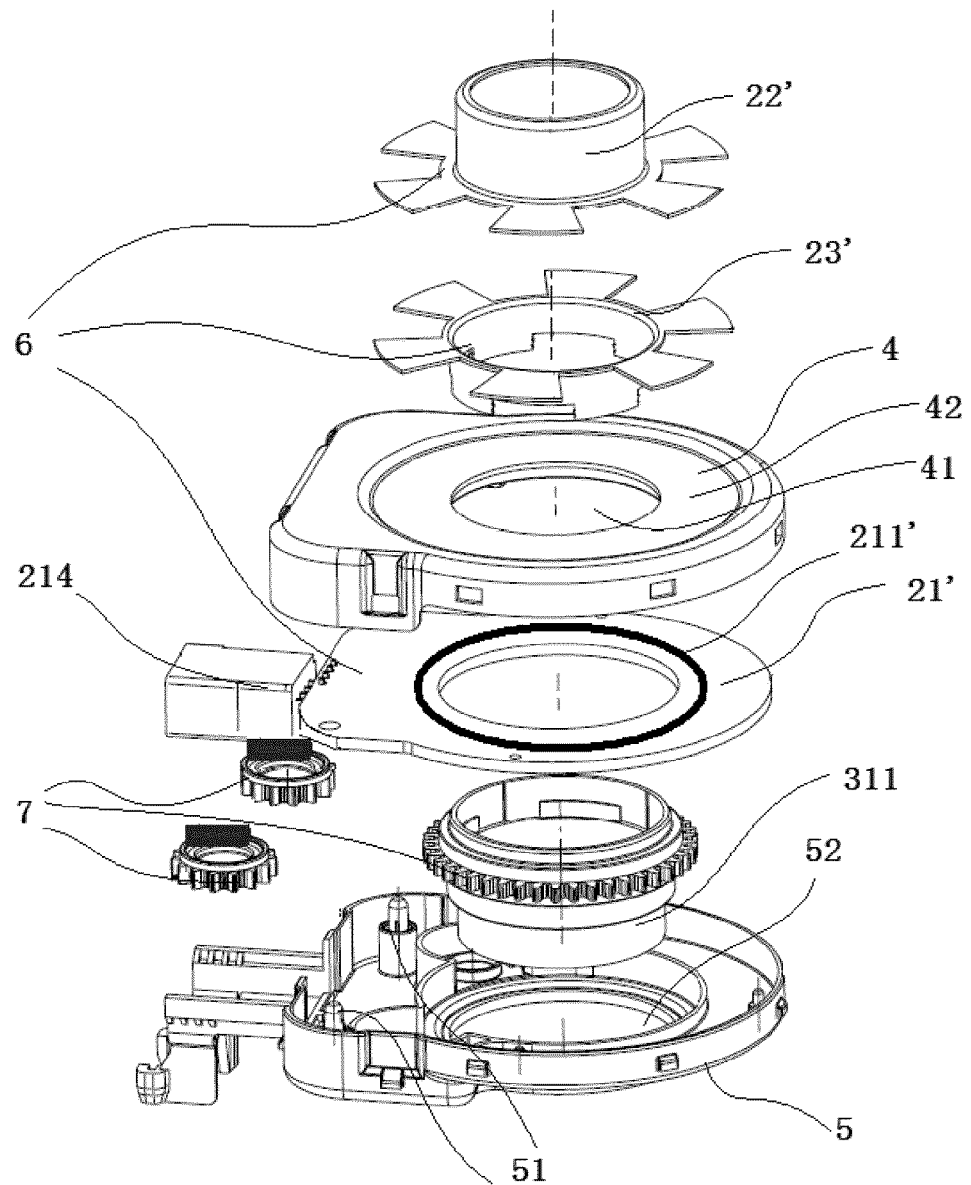
FIG. 13 shows, as an exploded view, an integrated torque and angle sensor according to a demonstrative embodiment of the present disclosure.
Figure 14:
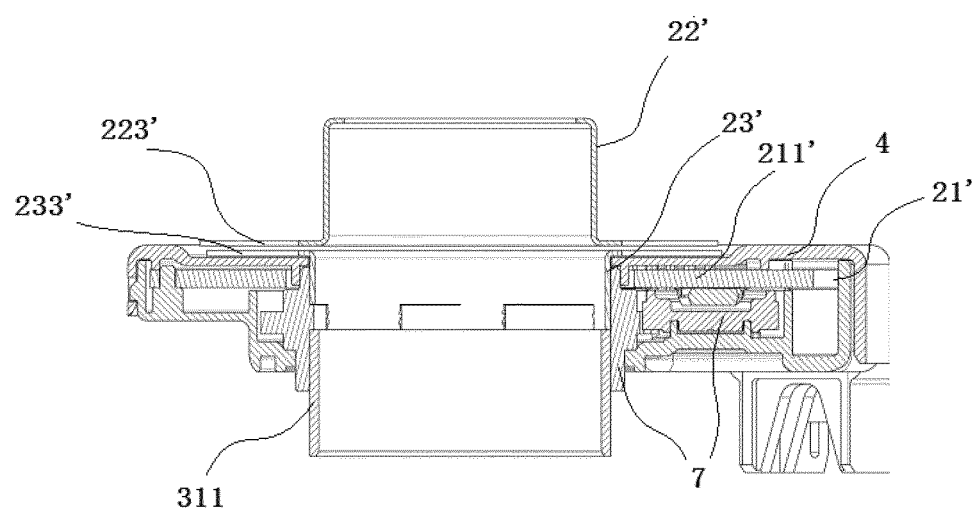
FIG. 14 shows, as a sectional view, an integrated torque and angle sensor in an assembled state.

A third aspect of the present disclosure relates to an integrated torque and angle sensor, configured to simultaneously detect the steering torque and steering angle of the steering column 1. For this purpose, the integrated torque and angle sensor comprises a torque detection means for detecting steering torque, and an angle detection means for detecting a steering angle. The torque detection means and angle detection means are integrated as a single sensor FIG. 13 shows, as an exploded view, an integrated torque and angle sensor according to a demonstrative embodiment of the present disclosure. FIG. 14 shows, as a sectional view, an integrated torque and angle sensor in an assembled state.

As shown in FIG. 13, the integrated torque and angle sensor mainly comprises an upper cover 4, a lower cover 5, a torque detection means 6 and an angle detection means 7.

The torque detection means 6 is similar to the torque sensor 2 shown in FIGS. 4-6, and thus also comprises an input rotation component 22', an output rotation component 23', and an electromagnetic carrier 21' provided with a magnetic field generating coil 211' (only shown schematically in FIG. 13); however, as shown in FIG. 14, a first flat patterned structure 223' of the input rotation component 22' and a second flat patterned structure 233" of the output rotation component 23' are parallel to each other, not in a common plane.

The angle detection means 7 is configured here to be the same as the steering angle sensor 3 shown in FIG. 11, and the detection elements of the first angle detector and second angle detector are directly disposed in corresponding positions on the electromagnetic carrier 21' so as to face the first measurement gear and second measurement gear in a corresponding manner.

It can be seen from the above that the torque detection means 6 and angle detection means 7 share one electromagnetic carrier, e.g. a PCB, thus allowing further simplification of the structure and assembly process.

The following are disposed inside the lower cover 5: two posts 51 for rotatably receiving the first measurement gear and second measurement gear respectively; and a lower through-hole 52, adapted such that a sleeve 311 of the sleeve gear fixed to the output shaft can pass through the lower through-hole 52.

The electromagnetic carrier is provided with an electrical connector 214. The upper cover 4 is provided with an upper through-hole 41, and is connectable to the lower cover 5 by means of a snap-fit for example.

In an assembled state, the entire input rotation component and the second flat patterned structure of the output rotation component are located outside the upper cover 4, and the second flat patterned structure of the output rotation component abuts an outer surface of the upper cover 4, preferably being located in a recess 42 formed in the outer surface.

Those skilled in the art will understand that the integrated torque and angle sensor is not limited to the embodiment above, but may also be realized in any suitable form. For example, the torque sensor 2 may be configured as shown in FIGS. 4-6 or FIGS. 7-10.

The integrated torque and angle sensor shown in FIGS. 13 and 14 can detect steering angles of the steering column 1 in a wider range, e.g. up to +/−780 degrees. Thus, the integrated torque and angle sensor is suitable for use in systems such as electromechanical steering systems having shaft balance.

In the case of angle measurement application scenarios involving electric power steer-by-wire systems and possible future electric power steering systems where +/−360 degrees is sufficient, just one measurement gear is needed, because steering angles in this range can be detected jointly on the basis of rotation angle information obtained by this single measurement gear and output shaft rotation angle information obtained by the second flat patterned structure of the output rotation component. In this case, such an integrated torque and angle sensor can be obtained by removing one measurement gear from the previously described integrated torque and angle sensor and altering the hardware packaging of the electromagnetic carrier.

Similarly, in the case of a steering angle sensor covering +/−360 degrees, it is sufficient to use only one measurement gear and the second flat patterned structure of the output rotation component, thus the input rotation component can also be removed. Of course, both measurement gears could also be retained, such that the second flat patterned structure of the output rotation component is only used to increase the steering angle measurement precision.

Thus, an independent torque sensor, an independent steering angle sensor and an integrated torque and angle sensor for different application scenarios can be obtained from the integrated torque and angle sensor shown in FIGS. 13 and 14 by merely removing one or more components and possibly altering the hardware packaging; this is very advantageous.

For steering columns of different sizes, the electromagnetic carrier as a complex electrical device can remain unchanged; it is only necessary to choose some suitable mechanical components having corresponding sizes. This is also very advantageous.

Although the present disclosure has been explained and described here with reference to specific embodiments, the present disclosure is not limited to the details shown. These details may be amended in various ways within the scope of the present disclosure.

The invention claimed is:

1. A torque sensor for detecting a steering torque of a steering column, wherein the steering column comprises an input shaft, an output shaft and a torsion bar connected between the input shaft and the output shaft, the torque sensor comprising:
   an input rotation component, configured to rotate with the input shaft and provided with a first conducting part;
   an output rotation component, configured to rotate with the output shaft and provided with a second conducting part; and
   an electromagnetic carrier, positioned in a positionally fixed manner at a location between the input rotation component and the output rotation component, and provided with a magnetic field generating component and a magnetic field detection component,
wherein
   the magnetic field generating component is configured to generate a magnetic field penetrating the first conducting part and the second conducting part,
   the magnetic field detection component is configured to detect a change in the magnetic field caused by a change in the positions of the first conducting part and second conducting part in the magnetic field when the steering column is under torsional stress, and
   the sensor is configured to determine steering torque using the detected change in the magnetic field.

2. The torque sensor as claimed in claim 1, wherein:
   a relative rotation angle of the input shaft relative to the output shaft is determined on the basis of the detected change in the magnetic field; and
   the sensor is configured to determine steering torque using the relative rotation angle.

3. The torque sensor as claimed in claim 2, wherein at least one of:
   the magnetic field generating component is configured in the form of an annular magnetic field generating coil; and
   the magnetic field detection component is configured in the form of an annular magnetic field detection coil.

4. The torque sensor as claimed in claim 2, wherein:
   a first rotation angle of the input shaft relative to the electromagnetic carrier is determined using a detected change in the magnetic field caused by a change in the position of the first conducting part in the magnetic field;
   a second rotation angle of the output shaft relative to the electromagnetic carrier is determined using a detected change in the magnetic field caused by a change in the position of the second conducting part in the magnetic field; and
   the relative rotation angle is determined on the basis of the first rotation angle and the second rotation angle.

5. The torque sensor as claimed in claim 4, wherein:
   the magnetic field detection component comprises a first magnetic field detection element configured to detect a change in the magnetic field caused by a change in the position of the first conducting part in the magnetic field;
   the magnetic field detection component comprises a second magnetic field detection element configured to detect a change in the magnetic field caused by a change in the position of the second conducting part in the magnetic field; and
   the first magnetic field detection element and the second magnetic field detection element are disposed at opposite sides of the electromagnetic carrier, such that the first magnetic field detection element faces the first conducting part, and the second magnetic field detection element faces the second conducting part.

6. The torque sensor as claimed in claim 1, wherein:
   the electromagnetic carrier comprises a printed circuit board and an electrical connector, and is provided with a mounting through-hole;
   the steering column passes through the mounting through-hole during use; and
   the magnetic field generating component and magnetic field detection component are disposed on the printed circuit board.

7. The torque sensor as claimed in claim 1, wherein:
   the first conducting part is configured to extend radially along a first plane perpendicular to a longitudinal axis of the steering column; and
   the second conducting part is configured to extend radially along a second plane perpendicular to the longitudinal axis of the steering column.

8. The torque sensor as claimed in claim 7, wherein at least one of:
   at least one of the first conducting part and the second conducting part is configured as a metal insert; and
   at least one of the first conducting part is configured as a first flat patterned structure, and the second conducting part is configured as a second flat patterned structure.

9. The torque sensor as claimed in claim 8, wherein:
   the magnetic field generating component has a changing electromagnetic characteristic at least within a predetermined angular range in a circumferential direction that is unique with position.

10. The torque sensor as claimed in claim 8, wherein:
    the first plane is positioned closer to the input shaft than the second plane, such that the first conducting part and the second conducting part are spaced apart axially.

11. The torque sensor as claimed in claim 10, wherein at least one of:
    the first flat patterned structure is configured to have multiple first teeth distributed in a circumferential direction; and the second flat patterned structure is configured to have multiple second teeth distributed in a circumferential direction.

12. The torque sensor as claimed in claim 11, wherein at least one of:
at least one of the multiple first teeth have the same shape and the multiple second teeth have the same shape; and
the number of multiple first teeth is equal to the number of multiple second teeth; and
the multiple first teeth and the multiple second teeth are staggered with respect to each other.

13. The torque sensor as claimed in claim 11, wherein at least one of:
the multiple first teeth or the multiple second teeth are connected at an outer radial end thereof to an outer ring and the multiple first teeth or the multiple second teeth extend radially from an inner ring.

14. The torque sensor as claimed in claim 11, wherein:
the multiple second teeth comprise multiple third teeth and multiple fourth teeth;
the multiple third teeth and the multiple fourth teeth are distributed alternately;
the number of multiple first teeth, the number of multiple third teeth and the number of multiple fourth teeth are equal to each other, the multiple first teeth are located at a radial outer side of the multiple third teeth with a radial gap between them, and a radial length of the multiple first teeth is smaller than a radial length of the multiple fourth teeth; and
the multiple first teeth and the multiple fourth teeth extend radially outward to the same extent.

15. The torque sensor as claimed in claim 14, wherein:
the magnetic field generating component is disposed close to the radial gap;
a first magnetic field detection coil is located at a radial inner side of the magnetic field generating component, and used to detect rotation angle information of the output shaft; and
a second magnetic field detection coil is located at a radial outer side of the magnetic field generating component, and used to detect a change in angle between the first teeth and the fourth teeth.

16. The torque sensor as claimed in claim 7, wherein:
the first conducting part and the second conducting part are disposed at the same side of the electromagnetic carrier so as to be adjacent to the side of the electromagnetic carrier which is adjacent to the input shaft.

17. An integrated torque and angle sensor for detecting a steering torque and a steering angle of a steering column, the integrated torque and angle sensor, comprising:
a torque detection component configured to detect the steering torque; and
an angle detection component configured to detect the steering angle,
wherein
the torque detection component comprises the torque sensor as claimed in claim 1,
the angle detection component comprises a sleeve gear configured to be mounted on the output shaft or the input shaft, a first measurement gear meshed with the sleeve gear, and a first angle detector configured to measure a rotation angle of the first measurement gear,
the angle detection component is configured to detect the steering angle at least on the basis of rotation angle information of the output shaft or input shaft obtained through a change in the magnetic field caused by a change in the position of the second conducting part in the magnetic field, and the rotation angle of the first measurement gear,
the angle detection component further comprises a second measurement gear meshed with the sleeve gear, and a second angle detector for measuring a rotation angle of the second measurement gear,
a number of teeth of the first measurement gear and a number of teeth of the second measurement gear are chosen so as not to be precisely divisible by each other, and
detection of the steering angle is further based upon the rotation angle of the second measurement gear.

18. The integrated torque and angle sensor as claimed in claim 17, wherein:
the number of teeth of the first measurement gear and the number of teeth of the second measurement gear differ by one.

19. The integrated torque and angle sensor as claimed in claim 17, wherein
the first angle detector comprises a first magnet disposed in a fixed manner at a center of rotation of the first measurement gear, and a first detection element for detecting the rotation angle of the first measurement gear;
the second angle detector comprises a second magnet disposed in a fixed manner at a center of rotation of the second measurement gear, and a second detection element for detecting the rotation angle of the second measurement gear, and
the first detection element and the second detection element are disposed on the electromagnetic carrier.

20. A steering angle sensor for detecting a steering angle of a steering column, comprising:
a sleeve gear configured to be mounted on the steering column;
a first measurement gear meshed with the sleeve gear;
a first angle detector, configured to measure a rotation angle of the first measurement gear;
a rotation component, configured to rotate with the steering column and provided with a conducting part; and
an electromagnetic carrier, positioned in a positionally fixed manner and provided with a magnetic field generating component and a magnetic field detection component,
wherein
the magnetic field generating component is configured to generate a magnetic field penetrating the conducting part,
the magnetic field detection component is configured to detect a change in the magnetic field caused by a change in the position of the conducting part in the magnetic field when the steering column rotates,
rotation angle information of the steering column is obtained on the basis of the detected change in the magnetic field,
the steering angle sensor is configured to detect the steering angle using the rotation angle information of the steering column and the rotation angle of the first measurement gear,
the first angle detector comprises a first magnet disposed in a fixed manner at a center of rotation of the first measurement gear, and a first detection element configured to detect the rotation angle of the first measurement gear,
a second angle detector comprises a second magnet disposed in a fixed manner at a center of rotation of a second measurement gear, and a second detection element configured to detect the rotation angle of the second measurement gear, and the first detection element and the second detection element are disposed on the electromagnetic carrier.

* * * * *